(12) United States Patent
Zhang

(10) Patent No.: US 9,857,919 B2
(45) Date of Patent: *Jan. 2, 2018

(54) WEARABLE DEVICE WITH INTELLIGENT USER-INPUT INTERFACE

(71) Applicant: Hong Kong Applied Science and Technology Research Institute Company Limited, Hong Kong (HK)

(72) Inventor: Wei Zhang, Hong Kong (HK)

(73) Assignee: Hong Kong Applied Science and Technology Research, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,502

(22) Filed: Jul. 12, 2016

(65) Prior Publication Data

US 2016/0320919 A1 Nov. 3, 2016

Related U.S. Application Data

(63) Continuation-in-part of application No. 14/102,506, filed on Dec. 11, 2013, now Pat. No. 9,429,417, (Continued)

(51) Int. Cl.
*H04N 13/02* (2006.01)
*G06F 3/042* (2006.01)
(Continued)

(52) U.S. Cl.
CPC .......... *G06F 3/0425* (2013.01); *G01B 11/022* (2013.01); *G06F 3/042* (2013.01);
(Continued)

(58) Field of Classification Search
CPC ......... G01B 11/022; G06F 2203/04101; G06F 3/042; G06F 3/0425; G06F 3/0426; G06K 9/3233
(Continued)

(56) References Cited

U.S. PATENT DOCUMENTS 8,228,315 B1 * 7/2012 Starner ................ G02B 27/017
345/175
8,872,910 B1 * 10/2014 Vaziri .................... G02C 11/10
348/77
(Continued)

FOREIGN PATENT DOCUMENTS

CN 102354345 A 2/2012

OTHER PUBLICATIONS

Ham et al, Poster: Wearable Input Device for Smart Glasses Based on a Wirstband-Type Motion-Aware Touch Panel, 2014.*
(Continued)

*Primary Examiner* — Shan Elahi
(74) *Attorney, Agent, or Firm* — Spruson & Ferguson (HK)

(57) ABSTRACT

A wearable device, having a camera and a light source, receives user inputs by a first method of measuring a height of a finger-like object's tip above a reference surface if this surface is present, or a second method of estimating a 3D location of the tip. In the first method, a plain sheet of light is projected to the object, casting a shadow on the surface. A camera-observed shadow length is used to compute the tip's height above the surface. In the second method, the nearest and farthest locations of the tip are estimated according to pre-determined lower and upper bounds of the object's physical width. The object is then illuminated with a structured-light pattern configured such that an area between the nearest and farthest locations receives a portion of the pattern where this portion does not contain a repeated sub-pattern, enabling unique determination of the tip's 3D location.

22 Claims, 10 Drawing Sheets

Related U.S. Application Data which is a continuation-in-part of application No. 13/474,567, filed on May 17, 2012, now Pat. No. 9,092,090.

(51) Int. Cl.
  *G06K 9/32* (2006.01)
  *G01B 11/02* (2006.01)
(52) U.S. Cl.
  CPC ......... *G06F 3/0426* (2013.01); *G06K 9/3233* (2013.01); *G06F 2203/04101* (2013.01)
(58) Field of Classification Search
  USPC .......................................................... 348/61
  See application file for complete search history.

(56) References Cited

U.S. PATENT DOCUMENTS

| | | | |
|---|---|---|---|
| 2008/0013793 A1 | 1/2008 | Hillis et al. | |
| 2008/0030573 A1* | 2/2008 | Ritchey | H04N 7/18 348/36 |
| 2009/0167923 A1* | 7/2009 | Safaee-Rad | H04N 5/23212 348/345 |
| 2011/0012814 A1* | 1/2011 | Tanaka | G02B 27/0176 345/8 |
| 2011/0043644 A1* | 2/2011 | Munger | G02B 27/017 348/207.1 |
| 2011/0221657 A1* | 9/2011 | Haddick | G02B 27/017 345/8 |
| 2012/0162077 A1 | 6/2012 | Sze et al. | |
| 2012/0299870 A1* | 11/2012 | Chi | G02B 27/017 345/174 |
| 2012/0302289 A1* | 11/2012 | Kang | G06F 3/011 455/557 |
| 2013/0016070 A1* | 1/2013 | Starner | G02B 27/017 345/175 |
| 2014/0098224 A1 | 4/2014 | Zhang | |
| 2014/0120319 A1 | 5/2014 | Joseph | |
| 2014/0267666 A1* | 9/2014 | Holz | G06K 9/00355 348/77 |
| 2014/0293091 A1* | 10/2014 | Rhoads | G01J 3/513 348/234 |
| 2014/0354787 A1* | 12/2014 | Linnell | H04N 5/2224 348/61 |
| 2014/0378810 A1* | 12/2014 | Davis | G06T 5/40 600/407 |
| 2015/0073907 A1* | 3/2015 | Purves | G06Q 20/32 705/14.58 |
| 2015/0084855 A1 | 3/2015 | Song et al. | |
| 2015/0084884 A1 | 3/2015 | Cherradi El Fadili | |
| 2015/0138699 A1* | 5/2015 | Yamazaki | G06F 1/163 361/679.03 |
| 2015/0338652 A1* | 11/2015 | Lim | G06K 9/00201 345/158 |
| 2016/0028917 A1* | 1/2016 | Wexler | H04N 5/2257 348/169 |
| 2016/0044298 A1* | 2/2016 | Holz | H04N 13/0257 348/47 |
| 2016/0088280 A1* | 3/2016 | Sadi | H04N 19/54 348/48 |
| 2016/0178906 A1* | 6/2016 | Rider | G02B 27/0172 726/17 |

OTHER PUBLICATIONS

Tang et al, Making 3D eyeglasses try-on parctical.*
Written Opinion of the International Searching Authority dated Mar. 29, 2017 for the corresponding PCT application, including the International Search Report.

* cited by examiner

WEARABLE DEVICE WITH INTELLIGENT USER-INPUT INTERFACE

CROSS-REFERENCE TO RELATED APPLICATIONS

This application is a continuation-in-part of U.S. patent application Ser. No. 14/102,506 filed Dec. 11, 2013, which is a continuation-in-part of U.S. patent application Ser. No. 13/474,567 filed May 17, 2012. The disclosures of U.S. patent application Ser. No. 14/102,506 and U.S. patent application Ser. No. 13/474,567 are hereby incorporated by reference in their entirety.

FIELD OF THE INVENTION

The present invention generally relates to a wearable device having an interface for receiving user inputs. Particularly, the present invention relates to such wearable device configured to receive user inputs by determining a height of a finger-like object's tip above a reference surface, or a three-dimensional (3D) coordinate of such tip in air.

BACKGROUND

Computer-based automatic detection of an object touching a reference surface and/or determination of positional information (e.g., a coordinate in space) or motional information (e.g., velocity, acceleration) of the object finds a lot of applications in human-computer interactive entertainment and consumer electronics. In one such application, an interactive projection system for providing a display that interacts with a user is required to determine if a finger tip of the user touches a pre-defined region of a screen, in order that the interactive projection system receives user inputs. In another such application related to computer entertainment, the velocity of a user's finger striking a surface is used by a game to predict if the user is decisive or hesitant in providing an input to the game.

Recently, the emergence of wearable interactive-display devices, such as an interactive display integrated in an eyewear article, is shifting the paradigm of how a user interacts with the virtual and physical worlds. With a wearable interactive display for the user's eyes, the camera installed in the interactive display sees what the user sees. The user, hence, can link his or her interactions with the physical world to manipulate digital objects. However, such wearable device is usually worn on a part of the user's body to achieve mobility with the user. The relatively small display of the wearable device causes a limitation in the user-input means, and operation of the wearable device may cause inconvenience to the user. It is desirable and advantageous to obtain positional or motional information of the user's finger so as to allow the user of the wearable device to control digital information with his or her hands and fingers.

In US2014/0098224 (corresponding to U.S. patent application Ser. No. 14/102,506), it is disclosed a device that detects a height of a finger tip above a touch surface for determining if the finger touches the touch source so as to eventually determine a user input to the device. The device uses one image sensor, i.e. one camera, for detection of the finger tip's height above the touch surface. When the finger is illuminated, a shadow is cast on the touch surface. The camera is used to capture an image of the shadow. Based on the camera-observed shadow length, the finger tip's height above the touch surface is computed. However, when the detection method of this device is implemented in a wearable interactive display, there is a possibility that the finger tip's height above the touch surface is so large that it is difficult to detect the finger's shadow. It is desirable if the device is supplemented with an additional technique of detecting a 3D coordinate of the finger tip in air.

There is a need in the art for a wearable device that can detect a height of an object's tip above a surface if the surface is present, as well as can estimate a 3D coordinate of the tip in an absence of the surface.

SUMMARY OF THE INVENTION

The present invention provides a wearable device having a functionality of receiving user inputs by a first method of measuring a height of a finger-like object's tip above a reference surface, or a second method of estimating a 3D location of the tip. The wearable device comprises one or more processors, a camera and a light source. The light source is configured to generate a plain sheet of light and a structured-light pattern.

In the first method, the tip's height above the reference surface is determined as follows. First, determine parameters of a surface-plane equation for geometrically characterizing the reference surface. According to the parameters of the surface-plane equation, a height of the camera and a height of the light source above the reference surface are determined. In addition, obtain a surface profile of the reference surface, and a surface map configured to map any point on an image captured by the camera to a corresponding physical location on the reference surface. Furthermore, a region-of-interest (ROI) is determined from a ROI-determination image captured by the camera such that the ROI comprises an area surrounding and including the tip. Afterwards, the plain sheet of light is projected to an area that substantially covers at least the ROI such that the object around the tip is illuminated to form a shadow on the reference surface unless the object is substantially close to the reference surface. A camera-observed shadow length is then estimated from a ROI-highlighted image by using the surface map, where the ROI-highlighted image is captured by the camera after the plain sheet of light is projected. The camera-observed shadow length is a length of a part of the shadow formed on the reference surface along a topographical surface line and observed by the camera. A shadow-light source distance is also estimated from the ROI-highlighted image by using the surface map. The tip's height above the reference surface is estimated based on a set of data including the surface profile, the camera-observed shadow length, the shadow-light source distance, a distance measured in a direction parallel to the reference surface between the light source and the camera, the height of the camera above the reference surface, and the height of the light source above the reference surface.

In the second method, a 3D location of the tip is estimated as follows. A first image containing at least the tip in a presence of the plain sheet of light illuminating the object is captured by the camera. From the first image, determine an on-sensor location of the tip, and an on-sensor length of a physical width of the object. A nearest physical location and a farthest physical location of the tip are estimated according to a pre-determined lower bound and a pre-determined upper bound of the object's physical width, respectively, and further according to the on-sensor location of the tip, the on-sensor length of the object's physical width, and the focal length. Thereby, the tip is estimated to be physically located within a region-of-presence between the nearest and farthest physical locations. Then project the structured-light pattern to at least the region-of-presence such that a part of the object around the tip is illuminated with a first portion of the structured-light pattern. In particular, the light source configures the structured-light pattern such that a second portion of the structured-light pattern received by the region-of-presence does not contain any repeated sub-pattern. In this way, unique determination of the 3D location of the tip is enabled by identifying the first portion of the structured-light pattern illuminating the object. When the structured-light pattern is projected to the region-of-presence, a second image containing at least the part of the object around the tip is captured. The 3D location of the tip is determined by identifying the first portion of the structured-light pattern from the second image.

Other aspects of the present invention are disclosed as illustrated by the embodiments hereinafter.

DETAILED DESCRIPTION OF THE INVENTION

Figure 1B:
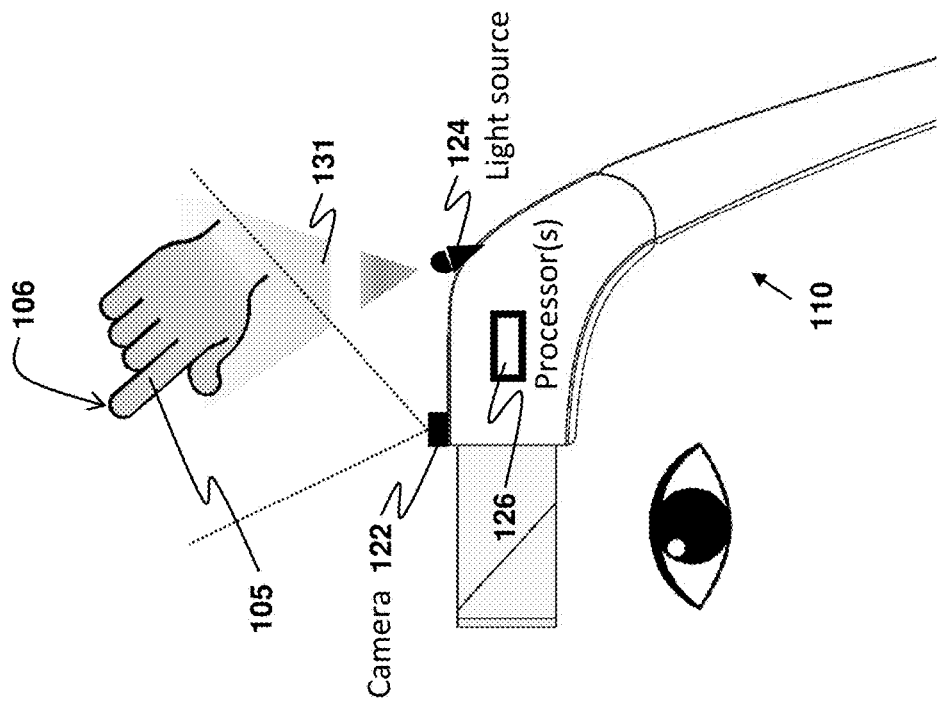
FIG. 1B depicts another application scenario that the wearable device estimates the 3D location of the finger tip in an absence of the reference surface.

As used herein, "a reference vertical direction" and "a reference horizontal direction" are defined as two directions that are mutually orthogonal, but these two directions are not further defined with reference to the direction of planetary gravity. Provided that a reference surface is substantially flat, the reference vertical direction is defined herein as a direction substantially perpendicular to the reference surface and the reference horizontal direction is defined with reference to the reference vertical direction. The reference surface may be, for example, a table surface or a paper surface on top of a table. In case the reference surface is not substantially flat, an imaginary flat surface sufficiently representative to the reference surface over surface roughness thereon is used instead of the original reference surface in defining the reference vertical direction. That is, the reference vertical direction is defined herein as a direction substantially perpendicular to this imaginary flat surface if the reference surface is not substantially flat.

It is used herein in the specification and the appended claims that "a height of a certain thing above a reference surface" is defined as a distance measured from the aforesaid certain thing to the reference surface along a reference vertical direction. Examples of the aforesaid thing include a tip of a finger-like object, a camera and a light source.

Furthermore, the following definitions are used herein in the specification and the appended claims. "Presence of a certain thing" means that this certain thing is present in a field of view (FOV) observable by a camera unless stated otherwise. Similarly, "absence of a certain thing" means that this certain thing is absent in the aforementioned FOV unless stated otherwise. "A structured-light pattern" means projection light having a radiant-power level that varies over an illuminated object when the projection light is projected thereon, the variation of the radiant-power level being selected to create a pre-defined pattern on the illuminated object. For example, if the pre-defined pattern is a grid and if the structured-light pattern is projected onto a plain surface, a picture of the grid is produced on the plain surface. In another example, the pre-defined pattern has an intensity profile following a sinusoidal wave. "A plain sheet of light" means projection light used for plainly illuminating an object. The plain sheet of light is different from a structured-light pattern since the former is not intended to project a pre-defined pattern onto the object. As an example, if the radiant-power level distribution of projection light over an illuminated object is substantially uniform, the projection light is a plain sheet of light. The light wave used in transmitting the structured-light pattern or the plain sheet of light is not limited only to be the light in the visible spectrum. The light wave may be invisible such as infrared.

In the present invention, it is provided with a wearable device having a functionality of receiving user inputs by a first method of measuring a height of a finger-like object's tip above a reference surface, or a second method of estimating a 3D location of the tip. The finger-like object may be a human finger, or any cylindrical object having a sharp point that is distinguishable from a body of the cylindrical object. An example of such cylindrical object is a pencil. In case the finger-like object is the human finger, the tip is simply a finger tip of the finger. Practically, the wearable device may be realized in a form of eye glasses or as a head-mounted device.

Preferably the wearable device is implemented to include both the first and second methods, although it is possible to include only one of the two methods in the wearable device if desired in some practical situations. The first method is applicable in the presence of the reference surface, but the second method is usable regardless of whether the reference surface is present or not. Nevertheless, the advantage of using the second method is apparent when the reference surface is absent.

Figure 1A:
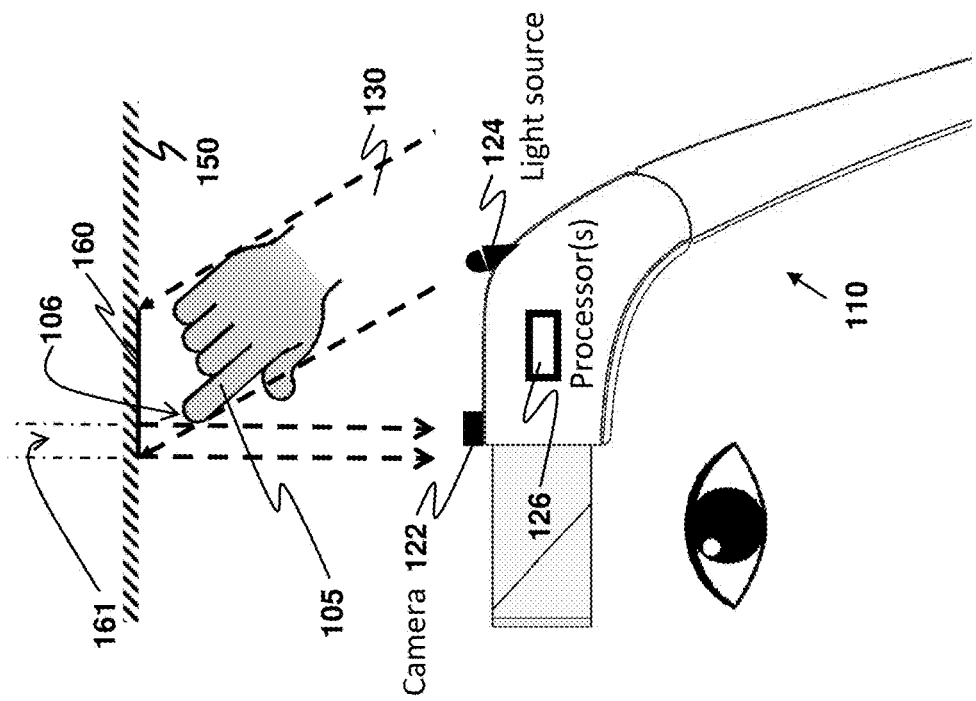
FIG. 1A depicts an application scenario that a wearable device estimates a finger tip's height above a reference surface by observing the length of a shadow cast by the finger on the reference surface.

By applying the first and second methods to two application scenarios depicted in FIGS. 1A and 1B, an intelligent user-input interface is realizable in the wearable device. FIGS. 1A and 1B depict the scenarios that a reference surface 150 is present and absent, respectively. A wearable device 110, realized in a form of eye glasses, is desired to determine one or more user inputs by observing a human finger 105. The finger 105 has a finger tip 106. The wearable device 110 comprises a light source 124 for illuminating the finger 105, a camera 122 for capturing images of the finger 105, and one or more processors 126 for performing computing and controlling tasks including controlling the camera 122 and the light source 124. In the presence of the reference surface 150 (FIG. 1A), the light source 124 projects a plain sheet of light 130 onto the finger 105, casting a shadow 160 on the reference surface 150. The camera 122 "sees" only a portion 161 of the shadow 160. Based on the length of the camera-observed portion 161, the height of the finger tip 106 above the reference surface 150 is estimated. In the absence of the reference surface 150 (FIG. 1B), the light source 124 projects a structured-light pattern 131 to the finger 105. The camera 122 captures an image of the finger 105 together with a portion of the structure-light pattern 131. The structured-light pattern 131 is designed such that the portion illuminating on the finger 105 assists the one or more processors 126 to determine a 3D position of the finger tip 106.

Details of the present invention are elaborated as follows.

Figure 2:
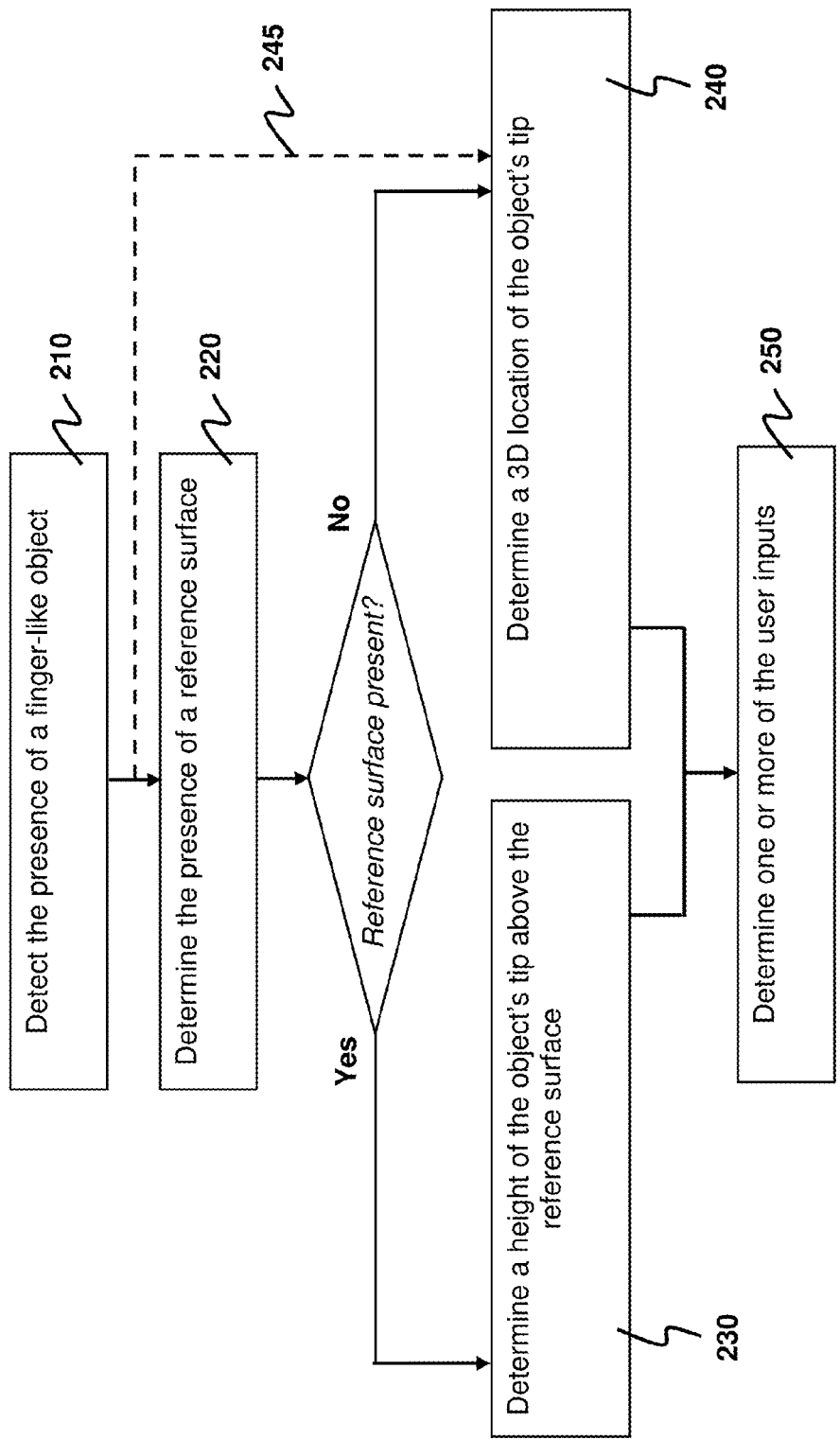
FIG. 2 depicts a flowchart for exemplarily illustrating a process of determining user inputs by the wearable device.

FIG. 2 is a flowchart exemplarily showing a flow of a process for determining user inputs by the wearable device. The wearable device comprises one or more processors, a camera and a light source. The light source is configured to generate a plain sheet of light and a structured-light pattern. The user inputs are determined by observing a finger-like object having a tip.

In a step 210, the presence of the finger-like object within a FOV of the camera is determined. Those skilled in the art can readily identify a technique known in the art to determine whether the finger-like object is present in the FOV through an image captured by the camera.

Figure 3:
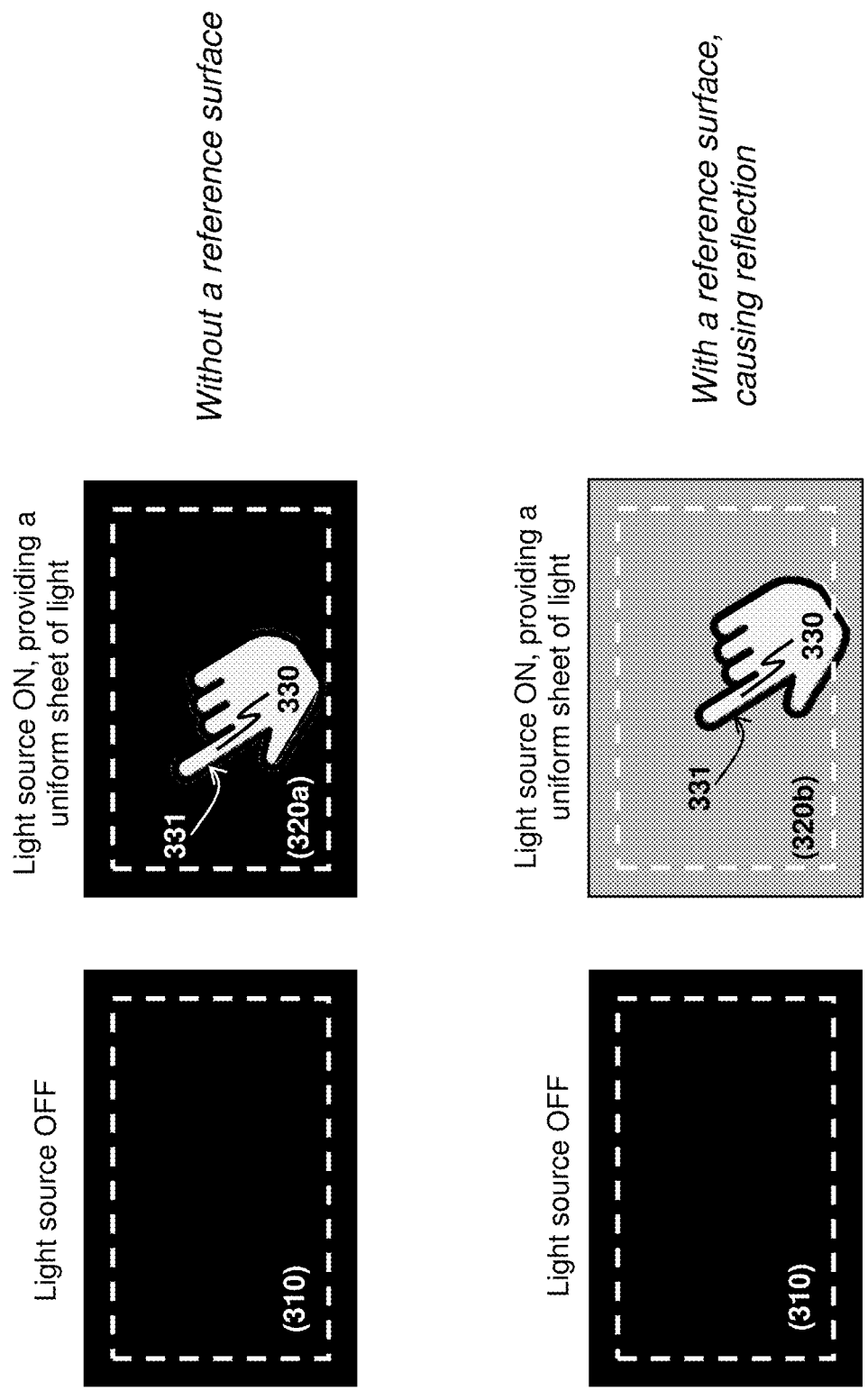
FIG. 3 depicts, according to one embodiment of the present invention, a method for determining whether the reference surface is present within the camera's field of view.

After the object is detected present, the presence of a reference surface is determined in a step 220. FIG. 3 depicts a technique for determining whether the reference surface is present within the FOV of the camera according to one embodiment. In an absence of the light source illuminating the object (namely, a finger 330), the camera captures the FOV to give a first image 310. In the presence of the light source illuminating the finger 330 with the plain sheet of light, the camera captures a second image (320a if a reference surface is absent, or 320b if present) containing the finger 330. In the presence of the reference surface, the reference surface reflects the plain sheet of light so that the second image 320b has a background intensity substantially different from a corresponding background intensity recorded in the first image 310. In the absence of the reference surface, the background intensity levels recorded in both the first image 310 and the second image 320a are not very different. Hence, the determination of whether the reference surface is present is achieved by first determining an intensity level of a surrounding area outside and adjacent a boundary 331 of the finger 330 from each of the first image 310 and the second image (320a or 320b). Then determine that the reference surface is present if the intensity level determined from the first image 310 is substantially different from the intensity level determined from the second image 320b. Otherwise, the reference surface is determined to be absent.

Refer to FIG. 2. If the reference surface is present, a height of the tip above the reference surface is determined in a step 230, so that in a step 250, one or more of the user inputs are determinable according to the tip's height. If the reference surface is absent, a 3D location of the tip is determined in a step 240, and thereafter the step 250 determines one or more of the user inputs according to the 3D location of the tip.

In one practical option, the step 250 includes determining that the object touches the reference surface if the tip's height above the reference surface is less than a predetermined threshold, whereby one or more of the user inputs are determined according to whether the object touches the reference surface.

As mentioned above, the determination of the 3D location of the tip may be performed regardless of whether the reference surface is present or absent. Optionally, the step 240 is performed right after the step 210 is completed without initiating the step 220, as indicated by a dashed arrow 245 in FIG. 2.

A. Determining the Tip's Height in the Presence of Reference Surface

The step 230 of determining the tip's height above the reference surface is developed based on the method disclosed in U.S. patent application Ser. No. 14/102,506.

A.1. A Mathematical Development

Figure 4A:
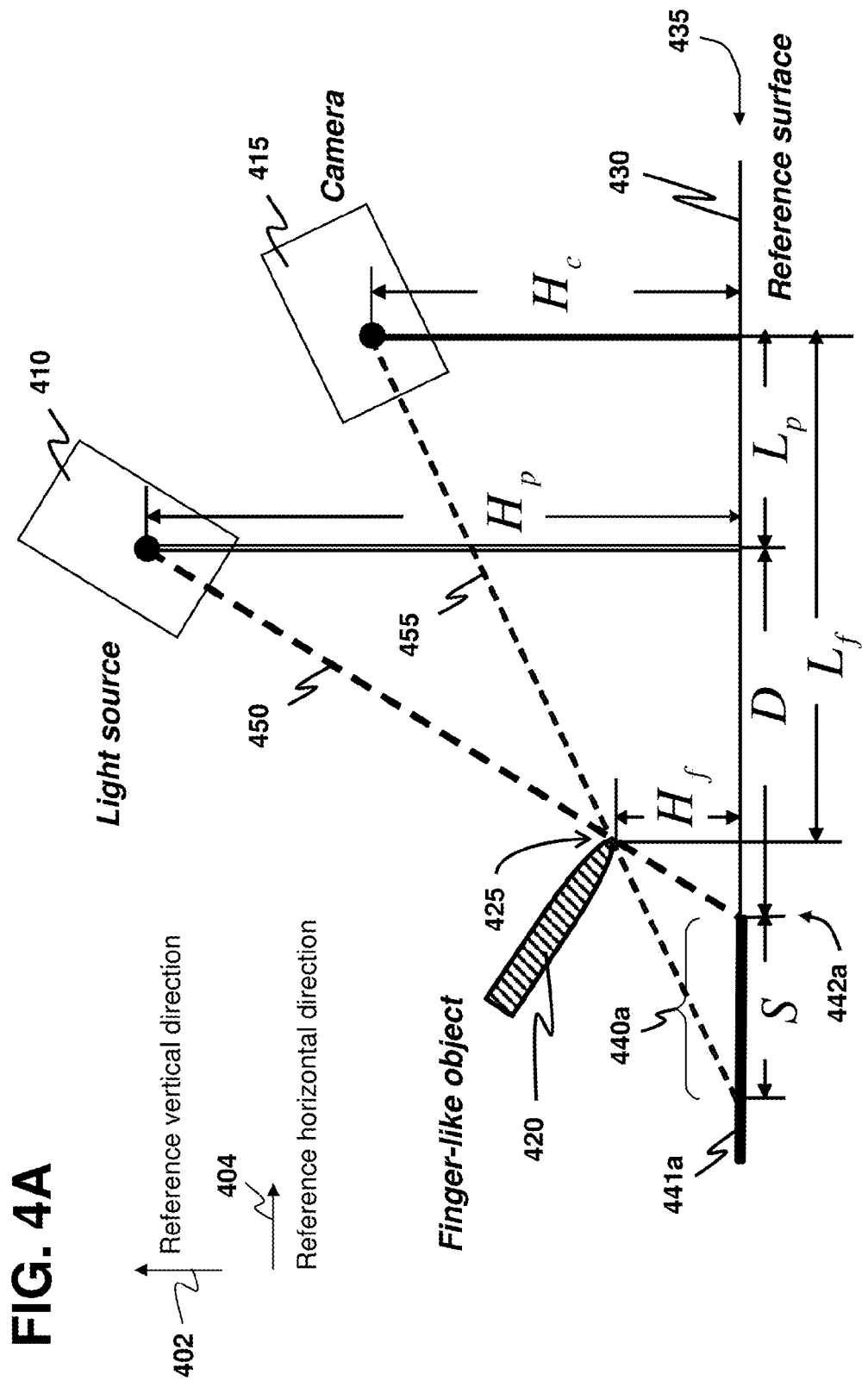
FIG. 4A depicts a model of a finger-like object casting a shadow on a reference surface as used in the determination of the height of the object's tip above the reference surface, where the model leads to a unique solution of the tip's height if a camera-observed shadow length is used in the calculation.

FIG. 4A depicts a model of a finger-like object casting a shadow on a reference surface. A reference vertical direction 402 and a reference horizontal direction 404 are defined with reference to a reference surface 430. A finger-like object 420 having a tip 425 is illuminated by a light source 410. Light of the light source 410 is blocked by the object 420 so that a shadow 441a is formed on the reference surface 430. In particular, the light of the light source 410 travels along a line-of-sight path 450 and touches the tip 425, thereby forming a starting point 442a of the shadow 441a. A camera 415 is used to capture a FOV including the object 420 and a part of the shadow 441a observable by the camera 415. The part of the shadow 441a observable by the camera 415 is formed along a topographical surface line 435 projected by a line-of-sight path 455 joining the camera 415 and the tip 425. The camera-unobservable part of the shadow 441a is blocked from the camera 415 by the object 420.

The part of the shadow 441a observable by the camera 415 has a camera-observable shadow length 440a denoted by S. Let $H_f$ be a height of the tip 425 above the reference surface 430. Let $L_f$ be a distance measured in the reference horizontal direction 404 between the camera 415 and the tip 425. Let D be a shadow-light source distance, defined as a distance measured in the reference horizontal direction 404 between the light source 410 and the starting point 442a of the shadow 441a. Let $L_p$ be a distance measured in the reference horizontal direction 404 between the light source 410 and the camera 415. Let $H_p$ be a distance measured from the light source 410 to the reference surface 430 along the reference vertical direction 402. Let $H_c$ be a distance measured from the camera 415 to the reference surface 430 along the reference vertical direction 402. As the two triangles having edges overlapped with the line-of-sight path 450 are similar, EQN. (1) is obtained:

$$\frac{D + L_p - L_f}{D} = \frac{H_f}{H_p}. \tag{1}$$

Furthermore, similarity between the two triangles having edges overlapped with the line-of-sight path 455 gives EQN. (2):

$$\frac{S + D + L_p - L_f}{S + D + L_p} = \frac{H_f}{H_c}. \quad (2)$$

From EQN. (1), expressing $L_f$ in terms of $H_f$ gives $$L_f = D + L_p - D\frac{H_f}{H_p}. \quad (3)$$

Substituting EQN. (3) into EQN. (2) followed by algebraic manipulation yields $$H_f = \frac{H_c H_p S}{(S + D + L_p)H_p - H_c D}. \quad (4)$$

It follows that $H_f$, the height of the tip 425 above the reference surface 430, is uniquely determinable based on S (the camera-observable shadow length 440a) and D (the shadow-light source distance), both of which can be obtained, as will be explained later, through a camera captured image and a surface map. As will be shown, the other parameters involved in EQN. (4), namely, $L_p$, $H_p$ and $H_c$, may be obtained in a measurement step after the reference surface 430 is detected.

From EQN. (4), it is also apparent that $H_f=0$ if $S=0$. It follows that if the camera-observed shadow length 440a is found to be substantially close to zero, or if the part of the shadow 441a observable by the camera 415 does not exist, it can be determined that the object touches the reference surface 430.

As an additional result, $L_f$ can be obtained from EQN. (3) with a computed value of $H_f$ given by EQN. (4), or can be directly computed by $$L_f = D + L_p - \frac{H_c DS}{(S + D + L_p)H_p - H_c D}. \quad (5)$$

FIG. 4A depicts that the camera 415 is positioned lower than the light source 410 in the reference vertical direction 402 and located from the object 420 farther than the light source 410 in the reference horizontal direction 404. However, the present invention is not limited to such positional configuration of the camera 415 and the light source 410. The light source 410 may be lower than the camera 415 in the reference vertical direction 202, provided that the light source 410 does not block the line-of-sight path 455. Similarly, the camera 415 may be nearer to the object 420 in the reference horizontal direction 404 than the light source 410 is, provided that the camera 415 does not block the line-of-sight path 450.

Figure 4B:
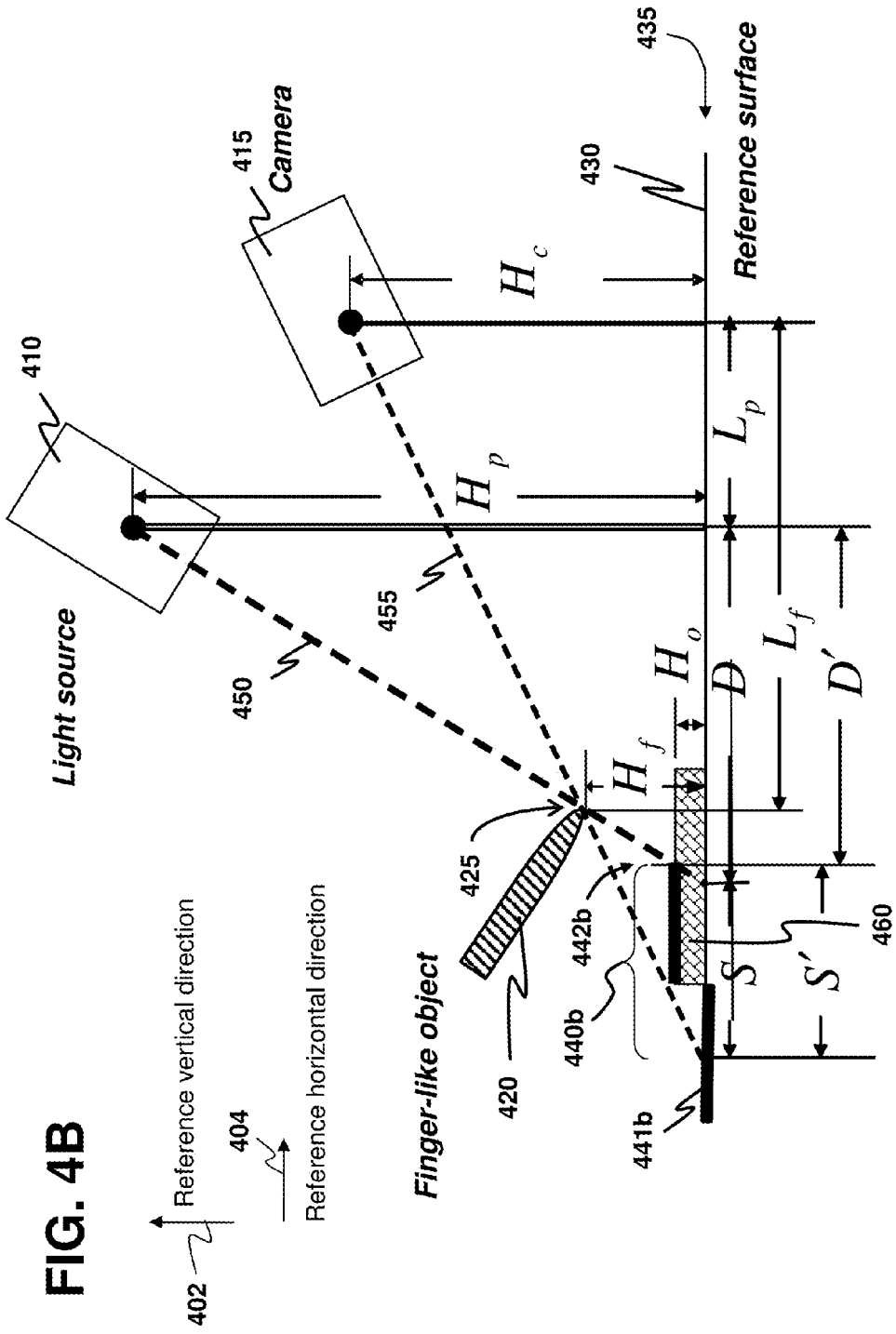
FIG. 4B depicts a similar model but a block is put on the reference surface and under the tip to emulate an effect that the reference surface is elevated at the location under the object, illustrating that a unique solution of the tip's height can also be obtained even if the reference surface is non-flat.

FIG. 4B shows a model similar to FIG. 4A except that a rectangular block 460 of height $H_o$ is introduced below the tip 425 of the object 420. Note that the introduction of the block 460 is similar to raising the reference surface 430 by a height of $H_o$ under the tip 425. A distorted shadow 441b is formed, having a shifted starting point 442b. It gives rise to a lengthened camera-observed shadow length 440b, S', and a shortened shadow-light source distance, D'. It can be shown that $$\frac{D'}{D} = \frac{H_p - H_o}{H_p} \quad (6)$$

and $$S = S' + D' - D. \quad (7)$$

Therefore, $H_f$ is still uniquely determinable. This result implies that even if the reference surface 430 is not substantially flat, a height distribution over the reference surface 430 (which is herein referred to as a surface profile of the reference surface 430) enables the tip 425's height over the reference surface 430 to be uniquely determinable. It is apparent to those skilled in the art to make appropriate modification to EQN. (4) to determine a tip's height above a non-flat reference surface with a surface profile thereof.

A.2. Details of the Step 230

In applying EQN. (4) to compute the tip's height above the reference surface, it is first noticed that $H_p$ and $H_c$ mean a height of the light source and a height of the camera, respectively, above the reference surface. It is also noticed that $L_p$ means a distance measured in a direction parallel to the reference surface between the light source and the camera. In addition, $H_p$ is measured from an optical center of the light source to the reference surface. Similarly, $H_c$ is measured from the camera's optical center to the reference surface. The distance $L_p$ is also measured in this sense.

Figure 5:
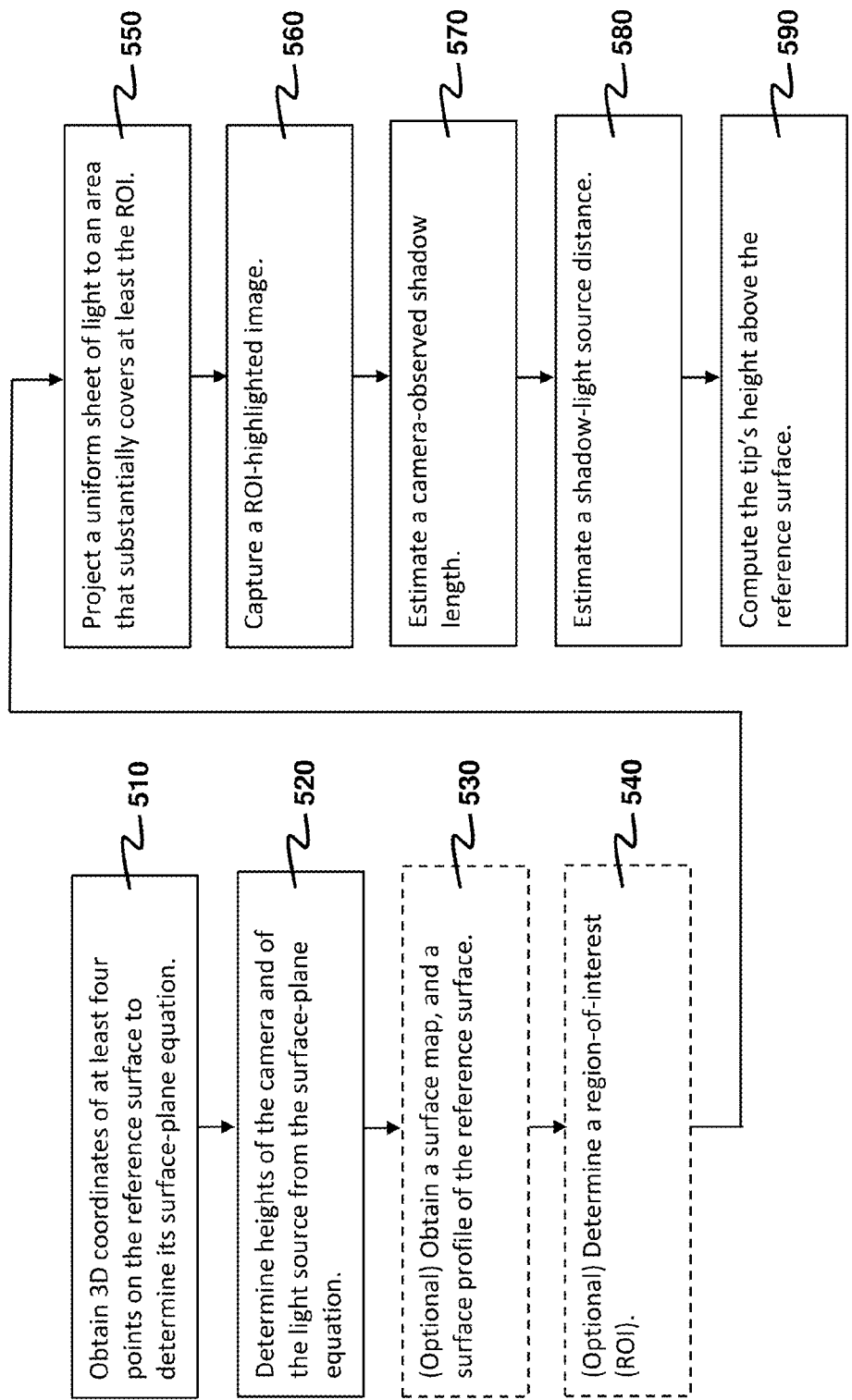
FIG. 5 provides an exemplary flow of steps for determining the tip's height above the reference surface.

FIG. 5 depicts a flowchart showing an exemplary flow of steps for determining the tip's height above the reference surface in the step 230.

It is required to determine $L_p$, $H_p$ and $H_c$ by measurement. As mentioned above in discussing the results obtained for the model of FIG. 4B, it makes sense to only consider a simplified model that the reference surface is flat. In a step 510, 3D coordinates of at least four points on the reference surface are obtained. Those skilled in the art are easy to understand that a flat plane in space can be represented by a surface-plane equation:

$$ax + by + cz = d \quad (8)$$

where a, b, c and d are parameters of this equation. Furthermore, these parameters can be determined by the obtained 3D coordinates of the at least four points. From the determined parameters, those skilled in art can easily determine $H_p$ and $H_c$ as perpendicular distances from the light source and from the camera, respectively, to the reference surface (step 520). The value of $L_p$ can also be easily determined from these parameters.

As mentioned above, a surface profile of the reference surface characterizes a height distribution over the reference surface. A surface map is configured to map any point (or any pixel) on an image captured by the camera to a corresponding physical location on the reference surface. By using the surface map, a point or a pixel of interest identified on the captured image can be mapped to the corresponding location on the reference surface. If the reference surface is substantially flat or if an accuracy requirement in determining the height of the tip is not high, the surface profile may be obtained by setting it to be a constant height above the reference surface, and the surface map is directly obtained from the surface-plane equation. Otherwise, an optional step 530 may be performed to obtain the surface profile and the surface map. Advantageously, the surface map and the surface profile can be determined by techniques disclosed in U.S. patent application Ser. No. 13/474,567. Although FIG. 5 shows that the step 530 is performed after $H_p$ and $H_c$ are determined in the step 520, the determination of the surface profile and the surface map may precede the step 520 and be absorbed in the step 510.

Optionally, a region-of-interest (ROI) on the reference surface is determined in a step 540. The ROI is determined from a ROI-determination image captured by the camera such that the ROI comprises an area surrounding and including the tip. An example of determining the ROI is given in U.S. patent application Ser. No. 14/102,506. In some realizations of the wearable device, it is possible that the step 540 is skipped and the ROI is simply set to be an entire field of illumination of the light source due to keeping these realizations simple or saving battery power.

After the ROI is determined, the plain sheet of light generated by the light source is directed to an area that substantially covers at least the ROI such that the object around the tip is illuminated to form a shadow on the reference surface unless the object is substantially close to the reference surface (step 550). As is mentioned above, the part of the shadow observable by the camera is formed along a topographical surface line projected by joining the camera and the reference peripheral point.

The camera is then used to capture a ROI-highlighted image (step 560).

After the ROI-highlighted image is obtained, a camera-observed shadow length is estimated (step 570). As is mentioned above, the camera-observed shadow length is a length of the part of the shadow observable by the camera. Estimation of the camera-observed shadow length from the ROI-highlighted image is accomplished by using the surface map or the surface-plane equation.

The shadow-light source distance is then estimated from the ROI-highlighted image by using the surface map or the surface-plane equation (step 580). As mentioned above, the shadow-light source distance is the distance measured in a direction parallel to the reference surface between the light source's optical center and the camera's optical center.

After the camera-observed shadow length and the shadow-projector distance are obtained, the tip's height above the reference surface ($H_f$) is estimated in a step 590 based on a set of data including the surface profile or the surface-plane equation, the camera-observed shadow length (S), the shadow-light source distance (D), the distance measured in a direction parallel to the reference surface between the light source and the camera ($L_p$), the height of the light source above the reference surface ($H_p$), and the height of the camera above the reference surface ($H_c$). If the reference surface is substantially flat, the tip's height above the reference surface can be computed according to EQN. (4).

B. Determining the 3D Location of the Tip

B.1. Details of the Step 240

Figure 6:
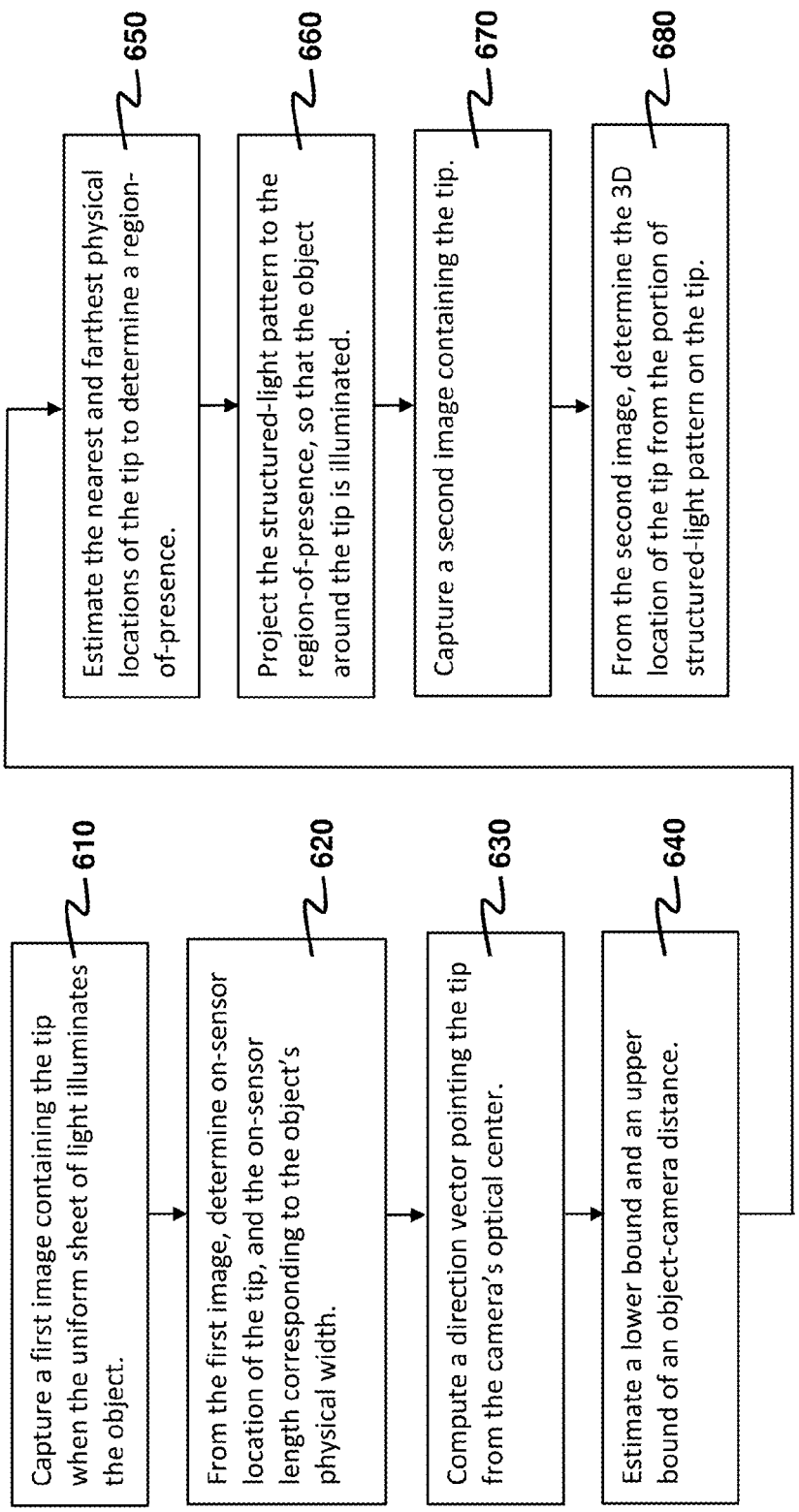
FIG. 6 depicts a flowchart showing an exemplary flow of steps for determining the 3D location of the tip.

FIG. 6 depicts a flowchart showing an exemplary flow of steps for determining the 3D location of the tip in the step 240. Illustration of the flow of steps is assisted by referring to FIG. 7, which depicts a model of a finger-like object 702 being illuminated with a light source 715 and taken images by a camera 710.

The finger-like object 702 has a tip 703. Since the object 702 is considered to be a cylindrical object as mentioned above, the object 702 has a physical width 705 that is measurable. If the object 702 is a human finger, statistical figures collected in the society indicate that the physical width of an adult's finger often falls within 1.6 cm to 2 cm.

The Inventors of the present invention have found that a lower bound and an upper bound of the object's physical width are determinable before applying the present invention to a practical application, and that the pre-determined lower and upper bounds are usable in determining the 3D location of the tip 703.

Figure 7:
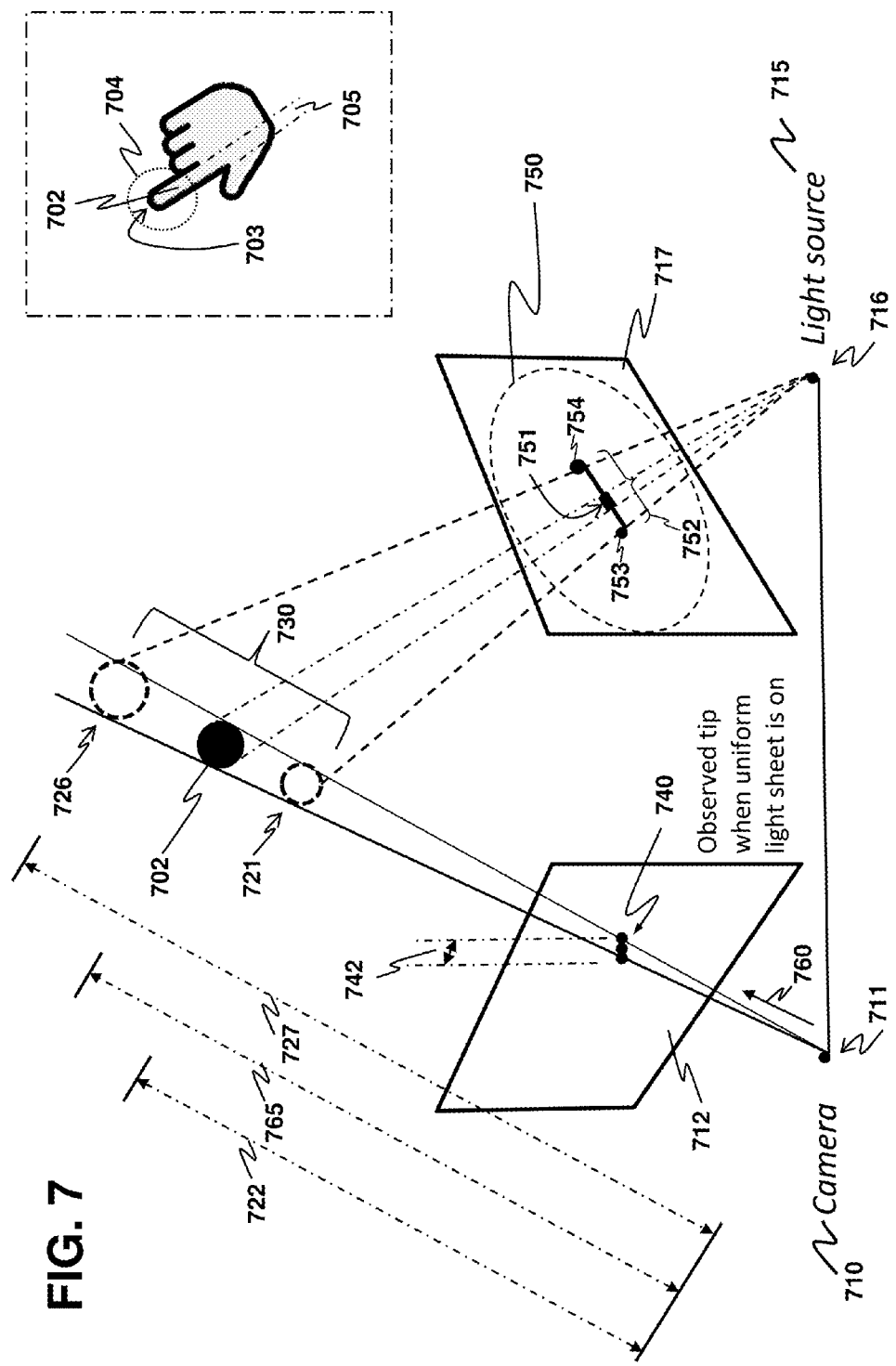
FIG. 7 depicts a model used for determining the 3D location of the tip, the model having a finger-like object being illuminated with a light source and taken images by a camera.

The camera 710 has an image sensor 712 for capturing each image of the object 702. In FIG. 7, a pinhole camera model is used to model the camera 710. By this model, the camera 710 has an optical center 711 located at a distance of a focal length from the image sensor 712. Those skilled in the art can readily appreciate that there is a mathematical relationship relating the FOV of the camera 710, the dimension of the image sensor 712 and the focal length under the pinhole camera model. Hence, the focal length can be evaluated. The light source 715 is capable of producing a plain sheet of light and a structured-light pattern. The light source 715 has a light-modulating panel 717, such as a liquid crystal display (LCD) panel, for introducing a pattern onto the plain sheet of light so as to generate the structured-light pattern. The light source 715 also has an optical center 716 located away from the light-modulating panel 717. Those skilled in the art can readily identify a mathematical relationship relating the location of the optical center 716, the field of illumination of the light source 715 and the dimension of the light-modulating panel 717. The light-modulating panel 717 may be implemented as a liquid crystal display (LCD) panel, which can produce a structured-light pattern that varies for adapting to different situations. As will be shown later, it is possible that the structured-light pattern is kept unchanged according to one embodiment of the present invention. In this case, the light-modulating panel 717 may be advantageously implemented as a fixed grating pattern or a fixed diffractive optical element rather than a LCD panel, which is generally more expensive. The 3D location of the tip 703 is determined by first capturing a first image containing at least the tip 703 in a presence of the plain sheet of light illuminating the object (step 610).

As the tip 703 is recorded in the first image, it implies that there is a location 740 on the image sensor 712 such that a light ray from the tip 703 has struck on this on-sensor location 740. From the first image, the on-sensor location 740 of the tip 703 is determined in a step 620. Furthermore, the step 620 includes determining an on-sensor length 742 corresponding to the physical width 705 of the object 702 from the first image. Those skilled in the art can make use of techniques known in the art to determine such on-sensor location 740 and on-sensor length 742 from the first image.

In a step 630, a direction vector 760 pointing the on-sensor location 740 of the tip 703 from the optical center 711 of the camera 710. Note that the tip 703 is located at a certain distance 765 from the camera 710's optical center 711 in a direction pointed by the direction vector 760. This certain distance 765 is named as an object-camera distance. It remains required to determine the object-camera distance 765.

To determine the object-camera distance 765, first estimate (in a step 640) a lower bound 722 and an upper bound 727 of the object-camera distance 765 according to the pre-determined lower bound and the pre-determined upper bound, respectively, of the object 702's physical width 705. The lower bound 722 indicates a nearest physical location 721 of the tip 703 while the upper bound 727 corresponds to a farthest physical location 726 thereof. Consider the nearest physical location 721, where the object 702 is supposed to have the pre-determined lower bound in the physical width 705. A simple analysis in geometry to the model of FIG. 7 reveals that the lower bound 722 of the object-camera distance 765 can be determined according to (a) the on-sensor length 742 of the object 702's physical width 705, (b) the focal length of the camera 710 (i.e. the distance between the optical center 711 and the image sensor 712), and (c) the pre-determined lower bound of the object 702's physical width 705. The upper bound 727 of the object-camera distance 765 can be determined similar to determining the lower bound 722 except that the pre-determined lower bound of the object 702's physical width 705 is replaced by the pre-determined upper bound thereof.

By some algebraic manipulations, the 3D coordinates of the nearest physical location 721 and of the farthest physical location 726 are calculated in a step 650 according to the lower bound 722 and the upper bound 727 of the object-camera distance 765, respectively, and further according to the direction vector 760. Thereby, the tip 703 is estimated to be physically located within a region-of-presence 730 between the nearest physical location 721 and the farthest physical location 726.

Thereafter, the light source 715 is activated to project the structured-light pattern (represented as 750 in FIG. 7) to at least the region-of-presence 730 such that a part 704 of the object 702 around the tip 703 is illuminated with a first portion 751 of the structured-light pattern 750 (step 660). Denote a second portion 752 of the structured-light pattern 750 to be a part of the structured-light pattern 750 received by the region-of-presence 730. In particular, the region-of-presence 730 receives said second portion 752 in a sense that when the region-of-presence 730 is filled with a certain reflecting thing, the reflecting thing is illuminated with the second portion 752 of the structured-light pattern 750. It is first noticed that the first portion 751 of the structured-light pattern 750 depends on the 3D location of the tip 703. In addition, the light source 715 configures the structured-light pattern 750 such that the second portion 752 of the structured-light pattern 750 does not contain any repeated sub-pattern. In this way, unique determination of the 3D location of the tip 703 is feasible by identifying the first portion 751 of the structured-light pattern 750 illuminating the object 702.

Accordingly, in a step 670, the camera 710 captures a second image containing at least the part 704 of the object 702 around the tip 703 when the structured-light pattern 750 is projected to the region-of-presence 730. The 3D location of the tip 703 is then determined in a step 680 by identifying, from the second image, the first portion 751 of the structured-light pattern 750.

B.2. Locating the Second Portion 752 on the Light-Modulating Panel 717

In order to configure the structured-light pattern 750 not to have a repeated pattern projected within any possible region-of-presence 730, it remains required to geometrically locate end-points 753, 754 on the light-modulating panel 717. Those skilled in the art can determine end-points 753, 754 of the structured-light pattern 750 on the light-modulating panel 717 by algebraic and geometric analysis. For brevity, each of the end-points 753, 754 is referred to as an on-panel location. In what follows, it is given an example for determining the on-panel locations 753, 754 of the nearest physical location 721 and of the farthest physical location 726, respectively.

Figure 8:
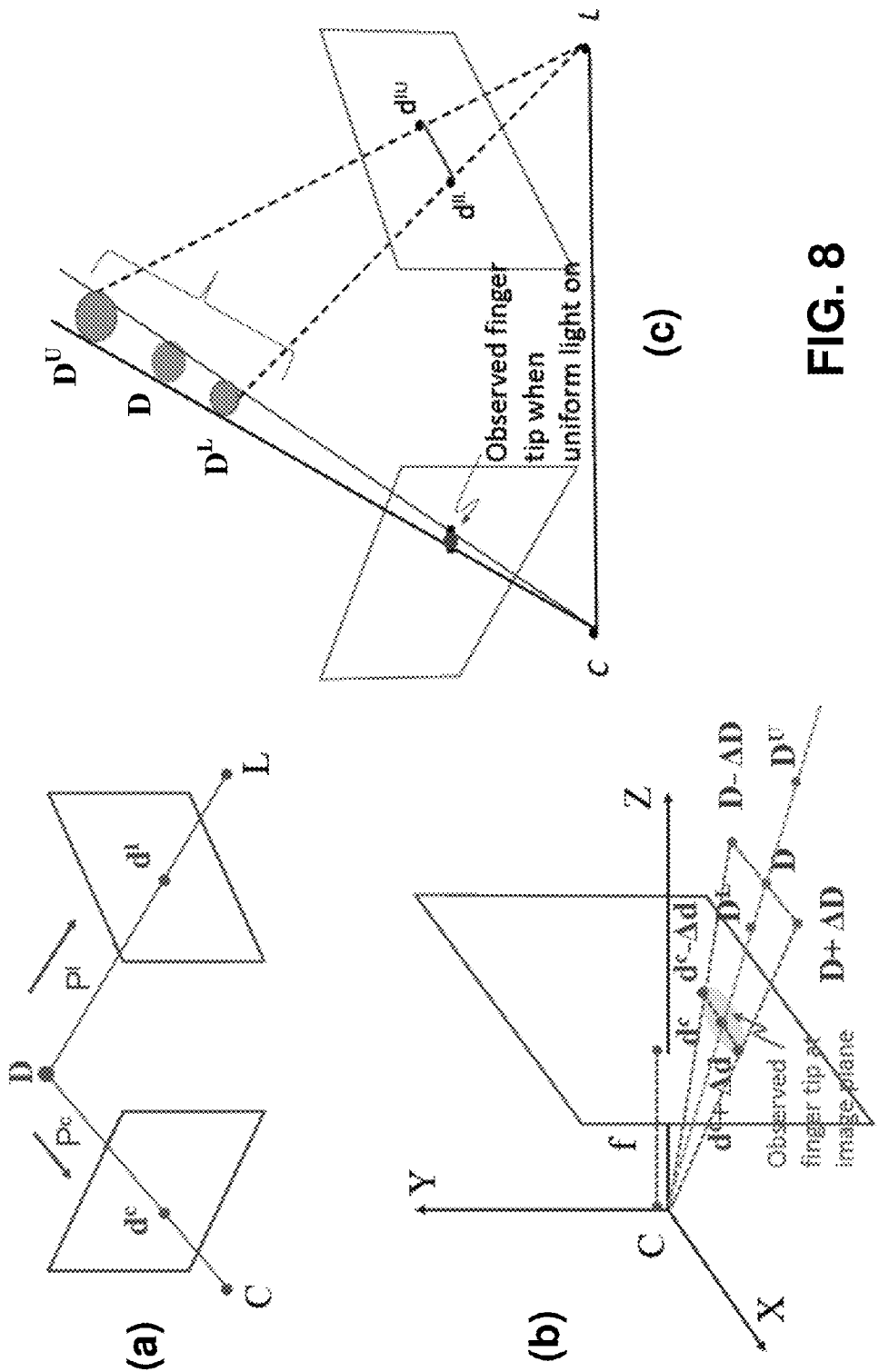
FIG. 8 depicts a model for determining the locations, on a light-modulating panel of the light source, corresponding to the nearest and farthest physical locations of the object's tip, where the model is given in three subplots (a)-(c).

FIG. 8 depicts a model for determining the on-panel locations 753, 754, where the model is given in three subplots (a)-(c). As an example, a finger tip is used as the tip 703.

In the subplot (a), suppose C and L are the optical centers of the camera and of the light source, respectively. If there is a point D in the space, such point is mapped to points $d^c$ and $d^l$ on the image sensor of the camera and the light-modulating panel of the light source by transformation matrices $P^c$ and $P^l$, respectively, with the equations $d^c=P^c D$ and $d^l=P^l D$, where: $P^c$ and $P^l$ are 3×4 matrices; $d^c$ and $d^l$ are length-3 vectors; and D is a length-4 vector. Since the positions of the camera and the light source are pre-defined, one can determine the transformation matrices $P^c$ and $P^l$.

Refer to the subplot (b). By using the pinhole camera model, suppose that the middle point of the observed finger tip on the image sensor is $d^c=[d_x^c, d_y^c, 1]^T$, and that the physical width of the object (i.e. the finger) extends from $d^c+\Delta d$ to $d^c-\Delta d$ on the image sensor. The points corresponding to $d^c$, $d^c+\Delta d$ and $d^c-\Delta d$ in the space are $D=[D_x, D_y, D_z, 1]^T$, $D+\Delta D=[D_x+\Delta D_x, D_y, D_z, 1]^T$ and $D-\Delta D=[D_x-\Delta D_x, D_y, D_z, 1]^T$, respectively, since the vertical part and the depth of the finger tip remain the same. If f, the focal length of the camera, is known, one obtains the relationships $d_x^c=f(D_x/D_z)$ and $d_y^c=f(D_y/D_z)$. As $\Delta d_x^c=f(\Delta D_x/D_z)$, it follows that $\Delta D_x=(D_z \cdot \Delta d_x^c)/f$ where $\Delta D_x$ is the physical width of the finger. Since $\Delta d_x^c$ is known and the range of the finger's physical width, $F_L < \Delta D_x < F_U$, is also known, one can determine the range of $D_z$ as $(f \cdot F_L)/\Delta d_x^c < D_z < (f \cdot F_U)/\Delta d_x^c$. Therefore, one can determine the region-of-presence of the finger tip, where the region-of-presence is along $D^L$ and $D^U$ shown in the subplot (c). Let $D^L=[D_x^L, D_y^L, D_z^L, 1]^T$. It follows that $D^L=[(D_z^L \cdot d_x^c)/f, (D_z^L \cdot d_y^c)/f, D_z^L, 1]^T$ where $D_z^L=(f \cdot F_L)/\Delta d_x^c$. The same approach can be used to obtain $D^U$.

Refer to the subplot (c). Since the transformation matrix $P^l$ is already known, one can map the physical locations $D^L$ and $D^U$ to the on-panel locations $d^{lL}$ and $d^{lU}$, respectively, by $d^{lL}=P^l D^L$ and $d^{lU}=P^l D^U$.

As long as a unique pattern exists between $d^{lL}$ and $d^{lU}$, a unique physical location of the finger tip can be determined.

B.3. Design of the Structured-Light Pattern 750

It is important to design a unique pattern without any repeated sub-pattern between the end-points 753, 754 on the light-modulating panel 717 of the structured-light pattern 750. There are two approaches in designing the structured-light pattern 750.

In the first approach, the structured-light pattern 750 is set to be reconfigurable by the light source and is adapted according to the nearest physical location 721 and the farthest physical location 726 that are estimated. It follows that an ad hoc design of the structured-light pattern 750 is required, and the structured-light pattern 750 varies from one time to another.

In the second approach, the structured-light pattern 750 is a static pattern that is invariant over time. That is, the static pattern is invariant to the nearest physical location 721 and the farthest physical location 726 calculated in any instance of determining the 3D location of the tip 703.

In general, the static-pattern design is preferred over the ad hoc design because electric power or battery power that is otherwise required to be spent on computing the ad hoc design from time to time can be saved. Note that the wearable device is a portable device, and often has a limited energy budget.

To determine the static pattern, one can first simulate all possible combinations of the on-sensor location 740 of the tip 703 and the on-sensor length 742 of the object 702's physical width 705. For each combination, a pair of the on-panel locations 753, 754 of the nearest physical location 721 and of the farthest physical location 726 are computed. Then the largest distance between the two on-panel locations

753, 754 among all combinations is identified. The static pattern is then designed such that within any part thereof that is less than the identified largest distance in length, there is no repeated sub-pattern.

Figure 9:
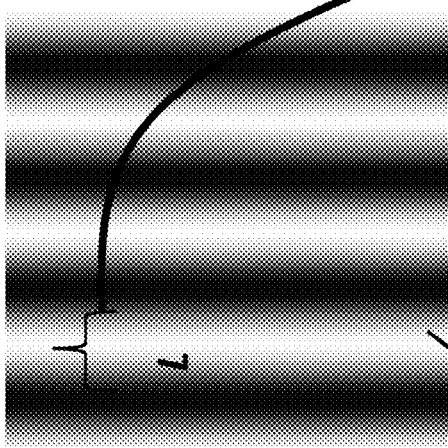
FIG. 9 depicts an example of a static-pattern design used for a structured-light pattern.
Figure 9:
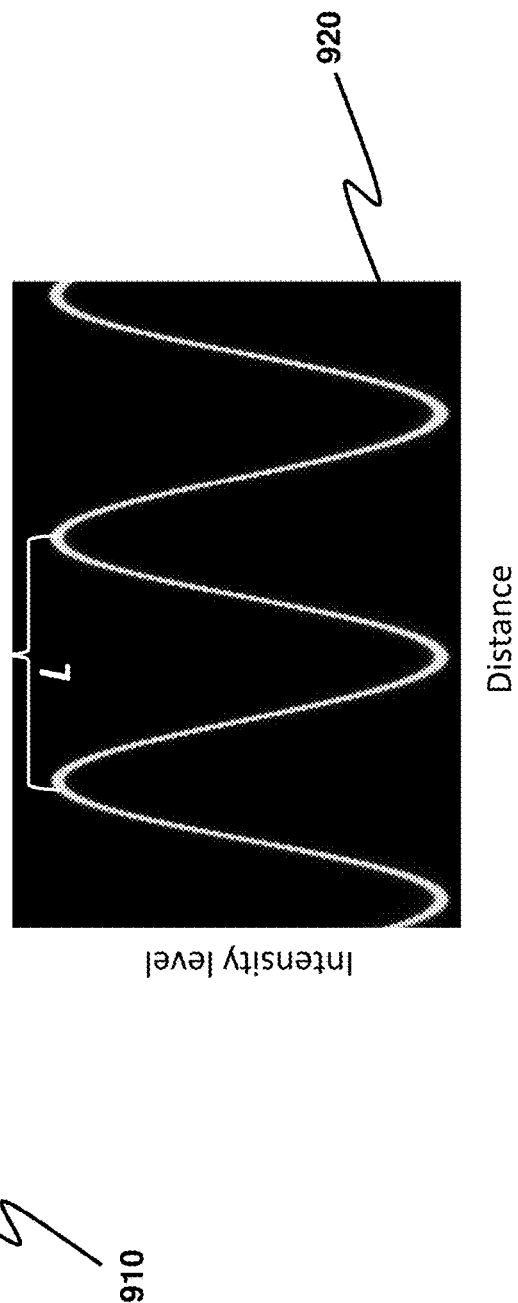

FIG. 9 depicts an example of a static pattern used for a structured-light pattern. A static pattern 910 shown in FIG. 9 is periodic in intensity, and has a grey level that varies like a sinusoidal wave with a wavelength L as shown in a distance-intensity plot 920. In particular, the wavelength L is selected to be greater than the aforementioned largest distance between the two on-panel locations 753, 754 so as to enable unique determination of the 3D location of the tip under an assumption that the tip is located inside the pre-defined space.

C. Remarks

In realizing a wearable device as disclosed herein, the light source may use visible or invisible light for generating a plain sheet of light and a structured-light pattern. The choice of light very much depends on applications of the wearable device. It is not intended to limit the present invention to use either visible or invisible light. Nonetheless, as the wearable device is predominantly used to obtain inputs from a user when the user looks at his or her finger, it is preferred to use invisible light, preferably infrared light, for the light source. When infrared light is used by the light source, the camera is then configured to sense at least infrared light in image capturing.

The one or more processors of the wearable device may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings regarding the method.

As a remark, US2014/0120319 has suggested a method for 3D-scanning an object by projecting a structured-light pattern onto the object and estimating positional parameters of the object after capturing an image of the object illuminated with the structured-light pattern. The method for determining a 3D position of a finger-like object as disclosed herein advances from the method of US2014/0120319 in that the pre-determined lower and upper bounds of the object's physical width are utilized to identify a limited size of a region-of-presence. The limited size of the region-of-presence enables easy and simple design of the structured-light pattern.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for receiving user inputs by a wearable device, the wearable device comprising one or more processors, a camera and a light source, the light source being configured to generate a plain sheet of light and a structured-light pattern, the camera having an image sensor and having an optical center located at a distance of a focal length from the image sensor, the method comprising:
   when a finger-like object having a tip is detected within a field of view (FOV) of the camera, determining a three-dimensional (3D) location of the tip so that one or more of the user inputs are determinable according to the 3D location of the tip;
   wherein the determining of the 3D location of the tip comprises:
   capturing a first image containing at least the tip in a presence of the plain sheet of light illuminating the object;
   from the first image, determining an on-sensor location of the tip, and an on-sensor length of a width of the object;
   estimating a nearest physical location and a farthest physical location of the tip according to a pre-determined lower bound and a pre-determined upper bound of the object's physical width, respectively, and further according to the on-sensor location of the tip, the on-sensor length of the object's width, and the focal length, whereby the tip is estimated to be physically located within a region-of-presence between the nearest and farthest physical locations;
   projecting the structured-light pattern to at least the region-of-presence such that a part of the object around the tip is illuminated with a first portion of the structured-light pattern while the region-of-presence receives a second portion of the structured-light pattern, wherein the light source configures the structured-light pattern to have the second portion not containing any repeated sub-pattern, enabling unique determination of the 3D location of the tip by uniquely identifying the first portion of the structured-light pattern inside the second portion of the structured-light pattern;
   capturing a second image containing at least the part of the object around the tip when the structured-light pattern is projected to the region-of-presence; and
   determining the 3D location of the tip by identifying, from the second image, the first portion of the structured-light pattern.

2. The method of claim 1, wherein the estimating of the nearest and farthest physical locations of the tip comprises:
   computing a direction vector pointing the on-sensor location of the tip from the optical center of the camera;
   estimating a lower bound and an upper bound of an object-camera distance according to the pre-determined lower bound and the pre-determined upper bound of the object's physical width, respectively, and further according to the focal length, and the on-sensor length of the object's physical width; and
   estimating the nearest physical location and the farthest physical location of the tip according to the lower bound and the upper bound of the object-camera distance, respectively, and further according to the direction vector.

3. The method of claim 1, wherein the determining of the 3D location of the tip is performed only after a reference surface is detected absent within the FOV.

4. The method of claim 1, wherein the structured-light pattern is reconfigurable by the light source and is adapted according to the nearest and farthest physical locations that are estimated.

5. The method of claim 1, wherein the structured-light pattern is a static pattern invariant to the nearest and farthest physical locations calculated in the determining of the 3D location of the tip.

6. The method of claim 5, wherein the static pattern is periodic in intensity and has a pre-determined wavelength for enabling unique determination of the 3D location of the tip that is located inside a pre-defined space.

7. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 1.

8. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 2.

9. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 3.

10. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 4.

11. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 5.

12. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 6.

13. The method of claim 1, further comprising:
when both the finger-like object and a reference surface are detected present within the FOV, determining a height of the tip above the reference surface so that one or more of the user inputs are determinable according to the tip's height;
wherein the determining of the tip's height above the reference surface comprises:
determining parameters of a surface-plane equation for geometrically characterizing the reference surface;
determining a height of the camera and a height of the light source above the reference surface according to the parameters of the surface-plane equation;
projecting the plain sheet of light to an area that substantially covers at least a region-of-interest (ROI) comprising an area surrounding and including the tip, such that the object around the tip is illuminated to form a shadow on the reference surface unless the object is substantially close to the reference surface;
estimating a camera-observed shadow length from a ROI-highlighted image, wherein the ROI-highlighted image is captured by the camera after the plain sheet of light is projected, and wherein the camera-observed shadow length is a length of a part of the shadow formed on the reference surface along a topographical surface line and observed by the camera;
estimating a shadow-light source distance from the ROI-highlighted image; and
estimating the tip's height above the reference surface based on a set of data including the surface-plane equation, the camera-observed shadow length, the shadow-light source distance, a distance measured in a direction parallel to the reference surface between the light source and the camera, the height of the camera above the reference surface, and the height of the light source above the reference surface.

14. The method of claim 13, further comprising:
determining that the object touches the reference surface if the tip's height above the reference surface is less than a pre-determined threshold; and
determining one or more of the user inputs according to whether the object touches the reference surface.

15. The method of claim 13, further comprising:
when the object is detected within the FOV, detecting whether the reference surface is also present within the FOV;
wherein the detecting of whether the reference surface is also present within the FOV comprises:
in an absence of the light source illuminating the object, capturing the FOV by the camera to give a first image;
in a presence of the light source illuminating the object with the plain sheet of light, capturing a second image containing the object by the camera;
from each of the first and second images, determining an intensity level of a surrounding area outside and adjacent a boundary of the object; and
determining that the reference surface is present if the intensity level determined from the first image is substantially different from the intensity level determined from the second image.

16. The method of claim 13, wherein the estimating of the tip's height above the reference surface comprises computing $$H_f = \frac{H_c H_p S}{(S + D + L_p)H_p - H_c D}$$

if the reference surface is substantially flat, where $H_f$ is the tip's height above the reference surface, S is the camera-observed shadow length, D is the shadow-light source distance, $L_p$ is the distance measured in the direction parallel to the reference surface between the light source and the camera, $H_p$ is the height of the light source above the reference surface, and $H_c$ is the height of the camera above the reference surface.

17. The method of claim 13, further comprising:
obtaining a surface profile of the reference surface, and a surface map configured to map any point on an image captured by the camera to a corresponding physical location on the reference surface;

wherein:
the camera-observed shadow length and the shadow-light source distance are estimated from the ROI-highlighted image by using the surface map; and
the set of data further includes the surface profile.

18. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 13.

19. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 14.

20. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 15.

21. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 16.

22. A wearable device comprising one or more processors, a camera and a light source, the light source being configured to generate a plain sheet of light and a structured-light pattern, the camera having an image sensor and having an optical center located at a distance of a focal length from the image sensor, wherein the wearable device is configured to execute a process for receiving user inputs according to the method of claim 17.

* * * * *